United States Patent [19]
Yoshimoto et al.

[11] Patent Number: 5,548,437
[45] Date of Patent: Aug. 20, 1996

[54] OPTICAL DEFLECTOR PROVIDED WITH SCANNING MIRROR ROTATABLE AROUND SHAFT BY DYNAMIC AIR PRESSURE

[76] Inventors: Shigeka Yoshimoto, No. 43-8-814, Kameido 1-chome, Koto-ku, Tokyo; Akiyoshi Takahashi, c/o Iruma Branch, Copal Electronics Co., Ltd., No. 110-1, Araku-shimoshinden, Iruma City, Saitama Prefecture; Toshiya Uchida, c/o Iruma Branch, Copal Electronics Co., Ltd., No. 110-1, Araku-shimoshinden, Iruma City, Saitama Prefecture; Rie Wakashima, c/o Iruma Branch, Copal Electronics Co., Ltd., No. 110-1, Araku-shimoshinden, Iruma City, Saitama Prefecture, all of Japan

[21] Appl. No.: 356,894

[22] Filed: Dec. 15, 1994

Related U.S. Application Data

[63] Continuation-in-part of Ser. No. 121,616, Sep. 16, 1993, abandoned.

[51] Int. Cl.[6] .................................................. G02B 26/08
[52] U.S. Cl. ..................... 359/200; 359/198; 384/107; 347/257
[58] Field of Search ..................................... 359/196, 197, 359/198, 200; 347/257, 260, 261, 263; 384/107–109, 590

[56] References Cited

U.S. PATENT DOCUMENTS

| | | | |
|---|---|---|---|
| 4,726,640 | 2/1988 | Iwana et al. | 359/200 |
| 4,805,972 | 2/1989 | Tanaka et al. | 359/200 |
| 5,069,515 | 12/1991 | Itami et al. | 359/200 |

FOREIGN PATENT DOCUMENTS

| | | |
|---|---|---|
| 61-138916 | 6/1986 | Japan. |
| 61-147218 | 7/1986 | Japan. |
| 61-236519 | 10/1986 | Japan. |

OTHER PUBLICATIONS

Abstract of Japanese Laid–Open Appln. No. 63–160394, Jan. 17, 1990.

*Primary Examiner*—Paul M. Dzierzynski
*Assistant Examiner*—Darren E. Schuberg
*Attorney, Agent, or Firm*—Wenderoth, Lind & Ponack

[57] ABSTRACT

An optical deflector is provided with a scanning mirror which is rotatable about a shaft and accompanied by a sleeve and hub. The pneumatic pressure around the mirror which is located within a cavity formed by a motor case of the deflector is maintained lower than an inside pneumatic pressure of a pneumatic pressure creation arrangement. The arrangement has the shaft provided with herringbone grooves engraved on the periphery thereof and the sleeve rotatable about the shaft together with the hub and the scanning mirror. When the scanning mirror rotates about the shaft, windage loss may be reduced, and when the inside pneumatic pressure between the shaft and the sleeve is kept higher than the atmospheric pressure, the rigidity of the shaft may be maintained during the rotation of scanning mirror about the shaft.

14 Claims, 8 Drawing Sheets

OPTICAL DEFLECTOR PROVIDED WITH SCANNING MIRROR ROTATABLE AROUND SHAFT BY DYNAMIC AIR PRESSURE

This is a Continuation-in-part of U.S. patent application Ser. No. 08/121,616, filed Sep. 16, 1993 now abandoned.

BACKGROUND OF THE INVENTION

The present invention relates to an optical deflector provided with a scanning mirror rotatable about a shaft by pneumatic pressure. This sort of mirror forms a part of a scanner system adaptable for an image or information processing device and a measurement apparatus. One prior art scanning mirror rotatable about a shaft by pneumatic pressure will be explained hereinafter with reference to the attached drawings, including FIG. 8, FIG. 9, FIG. 10 and FIG. 11.

FIG. 8 indicates a sectional view of a scanning mirror 5 rotatably supported by a vertical shaft 1a accommodated in a cavity V of a motor case 3 having a cover 4. The lower end of the shaft is fixedly held by the motor case. The shaft 1a is provided with a pair of herringbone grooves Ha and Hb formed around the periphery of the shaft 1a, as shown in FIG. 9. the lower end of the shaft is shrinkage fitted to the motor case 3 while the upper end thereof is fitted to the cover 4. A cylindrical sleeve 2 is rotatably arranged about the shaft 1a, leaving a clearance therebetween. A cylindrical magnet 22 is fixedly disposed around the lower portion of the sleeve 2. On the vertical inner wall of the motor case 3, a yoke 16 having coil 15 mounted thereon is fixed. Between the cover 4 and the motor case 3, there exists an O-ring 21, while another O-ring 20 is located between the shaft 1a and the cover 4, whereby the cover 4 and the motor case 3 are hermetically sealed. Numeral 17 is a Hall element holder to which a Hall element 18 is fitted. A thrust magnet 12 located on an inner base of the motor case 3 is arranged around the shaft 1a. Numeral 13 is another magnet, facing the thrust magnet 12 and having an opposite polarity, while numeral 14 is a spacer located underneath the magnet 22 and fitted to the magnet 13.

A hub 6 fixed around the sleeve 2 is provided with a polygon mirror 5, which is disposed horizontally on the hub 6 by means of a screw 9. Thus the sleeve 2, the hub 5 and the polygon mirror 5 are simultaneously rotatably arranged about the shaft 1a. A pair of magnets 10 and 11, each having an opposite pole N and S, are disposed face-to-face on the top end of the shaft 1a and on the under surface of the cover 4, respectively. It should be noted that instead of a polygon mirror 5, any type of flat mirror may also be adaptable.

With the energization of the magnet 22 by electrical current supplied via the coil 15, a motor driving means which, in this embodiment, is composed of a magnet 22 and the sleeve 2, begins to rotate about the shaft 1a with the sleeve 2 being supported by the spacer 14 and the magnet 13. Simultaneously with the rotation of the sleeves, a mirror rotating means which, in this case, is composed of the hub 6, the magnet 22 and the sleeve 2, is rotated about the shaft 1a accompanied by the mirror 5.

When the sleeve 2 is thus rotated, a clearance is maintained between the lower surface of the case 4 and the upper end of the sleeve 2 by means of a repulsion force created by the pair of magnets 10 and 11 and the pair of magnets 12 and 13, respectively positioned face-to-face and provided with opposite poles.

Corresponding to the rotation of the mirror rotating means and the motor driving means, as explained heretofore, air is sucked from suction intakes s, as show in FIG. 10, into the clearance existing between the shaft 1a and the sleeve 2 (FIG. 10), and a dynamic pneumatic pressure is created therein with the aid of the herringbone grooves Ha and Hb, whereby a constant rigidity of the shaft 1a is maintained.

FIG. 11 is a chart of the pneumatic pressure distribution existing in the clearance between the sleeve 2 and the shaft 1a when the sleeve 2 is rotated accompanied by the mirror 5. FIG. 10 indicates a sectional view of the sleeve 2 and a flat view of the shaft 1a. The structure shown in FIG. 10 may hereinafter be called a dynamic pneumatic pressure creation means wherein, corresponding to the rotation of the sleeve 2 as explained, air is sucked via suction intakes s into the dynamic pneumatic pressure creation means, with the result that pneumatic pressure inside the dynamic pneumatic pressure creation means is maintained higher than the circumferential air pressure outside thereof. Pneumatic pressure around the outside of the dynamic pneumatic pressure creation means and in the cavity may be maintained equal to atmospheric pressure.

The air pressure distribution inside the dynamic pneumatic creation means shown in FIG. 10 is illustrated in FIG. 11. In FIG. 11, the ordinate indicates dimensionless air pressure P, which represents an atmospheric pressure, while Z is the abscissa. The atmospheric pressure around the outside of both ends of the dynamic pneumatic pressure creation means is indicated by P=1, while on the inside of the means the pressure is indicated by P>1. Therefore, the outside or surrounding air pressure of the dynamic pneumatic creation means is equal to atmospheric pressure.

Windage loss W due to the rotation of the mirror is usually indicated as follows:

$W = Ps \times Nr^3 \times Km$, where
  Ps: circumferential pressure,
  Nr: number of rotation, and
  Km: coefficient of mirror configuration.

In this prior art, windage loss Wo may be indicated as follows:

$Wo = 1.0 \times Nr^3 \times Km$ (watt).

As is explained heretofore, windage loss W due to the rotation of the mirror is usually shown as: $W = Ps \times Nr^3 \times Km$ (watt), while in the prior art, as the circumferential air pressure around the pneumatic pressure creation means and in the cavity is already set as Ps=1, and the windage loss may be indicated as $Wo = Nr^3 \times Km$ (Watt). Therefore it is impossible to reduce the windage loss less than the value shown above.

It is natural in the case of the prior art that in proportion to the increase of the number of rotations Nr, or due to the coefficient of the configuration of the mirror, the windage loss becomes larger. If the motor torque becomes smaller than the windage loss, a motor of a large size, which requires the supply of more electric current, is required to resolve the situation, which results in bringing forth the generation of more heat by the increasing supply of electric current. In order to prevent the generation of heat, a type of radiation system must be installed, with a resultant increase in the production costs, coupled with the difficulty of the miniaturization of the device at a low cost.

SUMMARY OF THE INVENTION

An objective of the present invention is to present a scanning mirror which is arranged rotatably about a shaft accompanied by a sleeve and a hub, wherein pneumatic pressure around a mirror and a hub located within a cavity formed by a motor case with a cover is maintained lower than an inside air pressure of a pneumatic pressure creation means comprising a shaft provided with herringbone grooves engraved in the periphery thereof and a sleeve which is rotatable about the shaft together with the hub and the mirror, whereby windage loss due to the rotation of the mirror around the shaft is decreased.

Another object of this invention is to provide a scanning mirror arranged rotatably about a shaft accompanied by a sleeve and a hub wherein pneumatic pressure inside a dynamic pneumatic creation means is kept higher than atmospheric pressure, while a circumferential pressure around the hub and the mirror accommodated in a cavity formed by a motor case and a cover is maintained lower than atmospheric pressure, whereby a constant rigidity of the shaft is maintained during rotation of the mirror, and at the same time windage loss due to the rotation of the mirror is kept small.

DETAILED DESCRIPTION OF THE INVENTION

Figure 1:
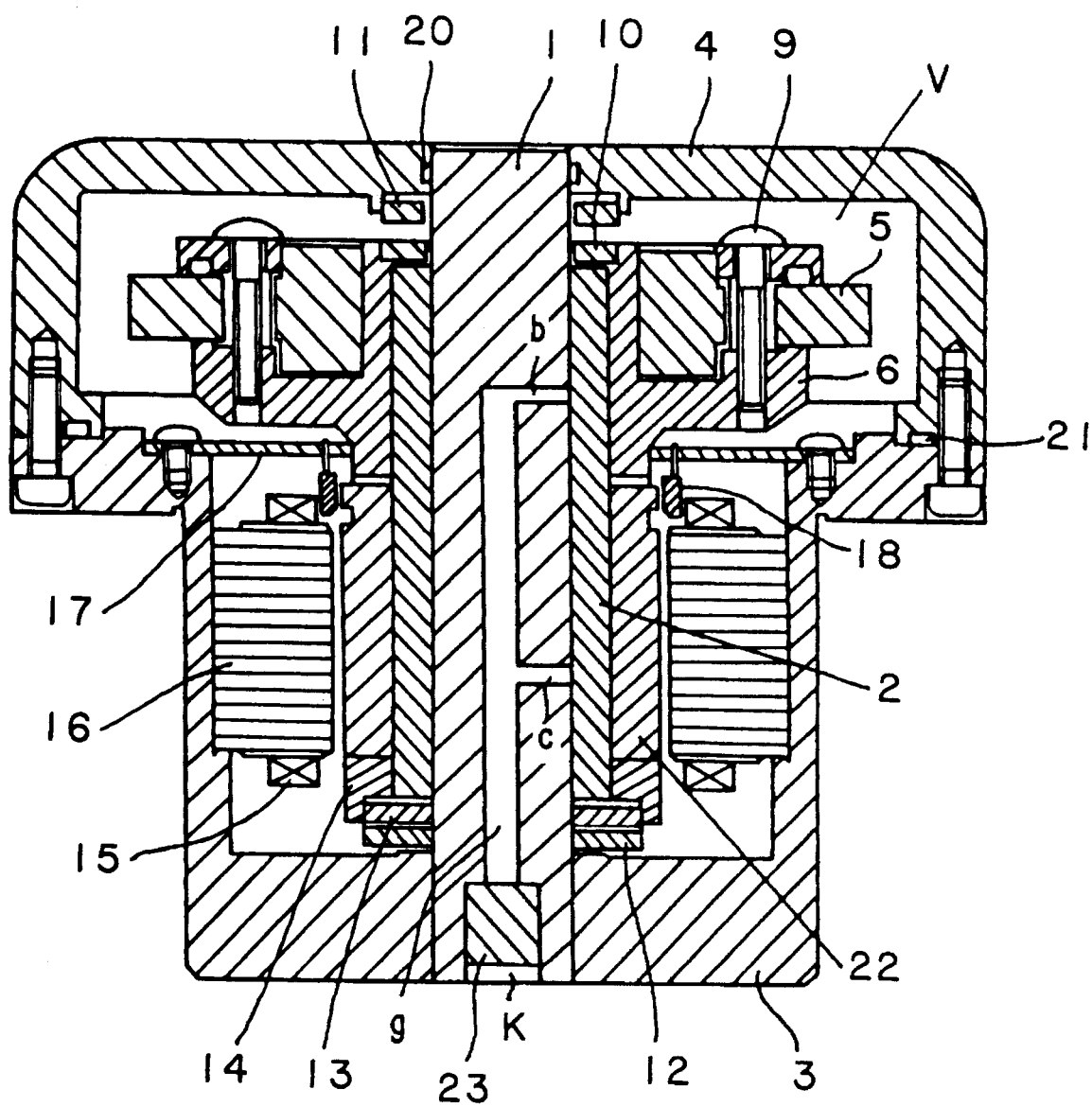
FIG. 1 illustrates a sectional front view of a mirror and other elements accommodated in a cavity of a motor case with a cover embodying the present invention.

Now referring to the drawings, preferred embodiments of this invention will be explained hereinafter.

Figure 8:
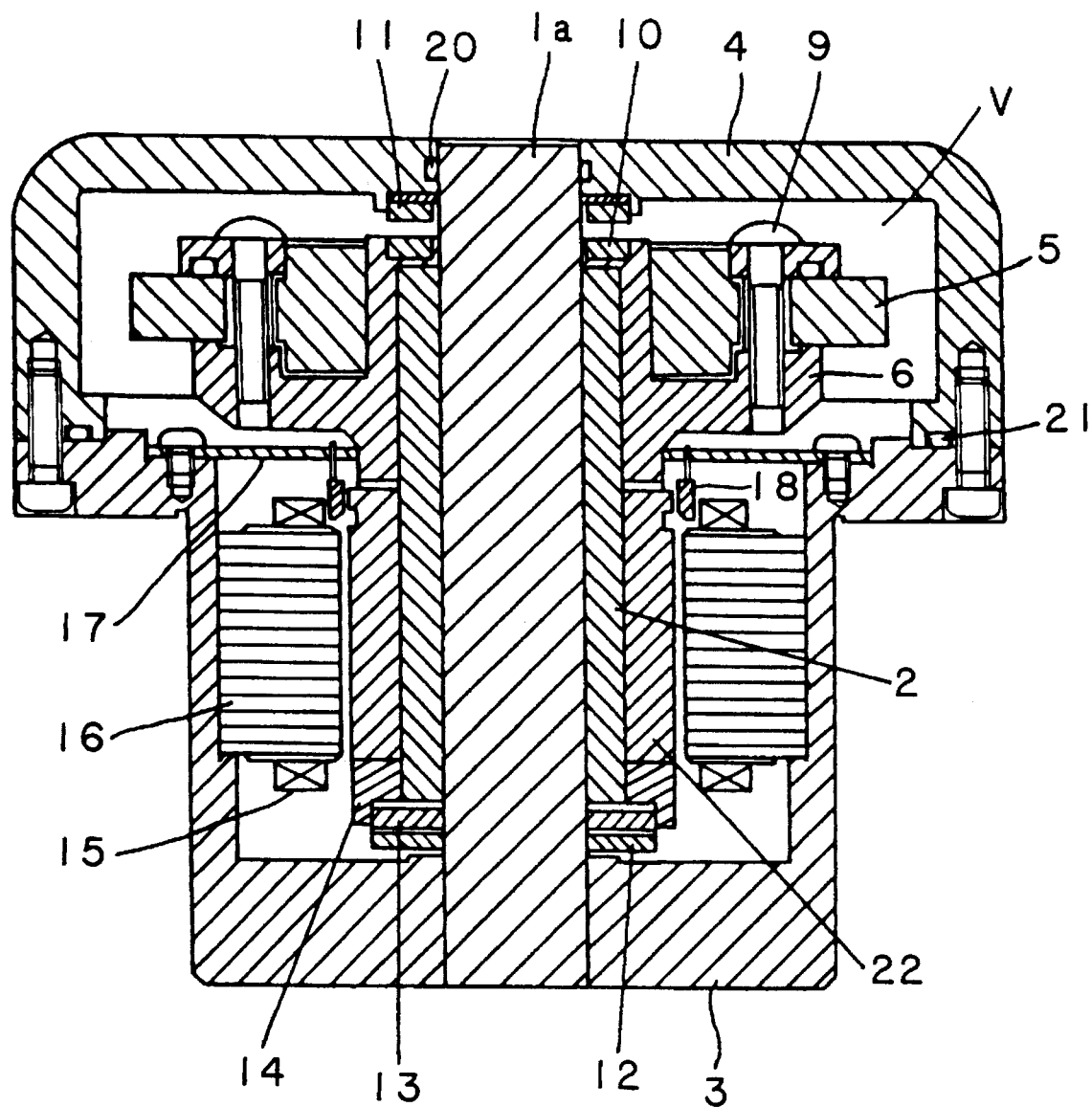
FIG. 8 is a sectional front view of a mirror and other elements in the prior art.
Figure 9:
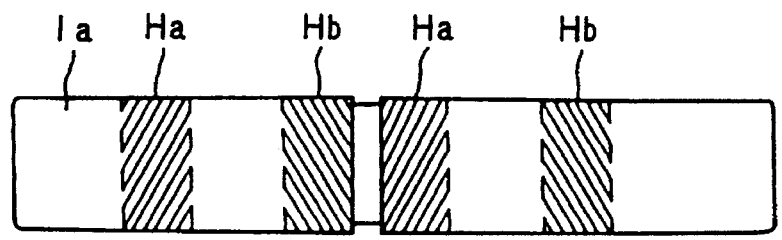
FIG. 9 illustrates a flat view of a prior art shaft.
Figure 10:
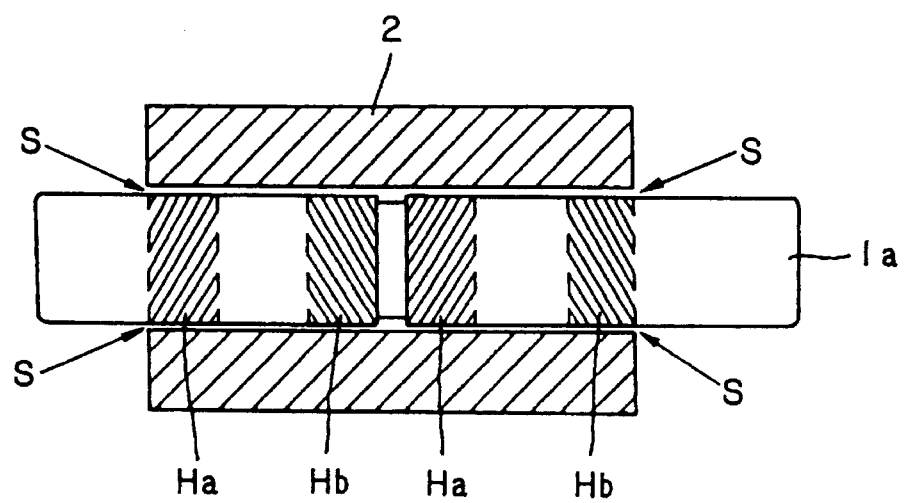
FIG. 10 illustrates a sectional flat view of a shaft and sleeve in the prior art.
Figure 11:
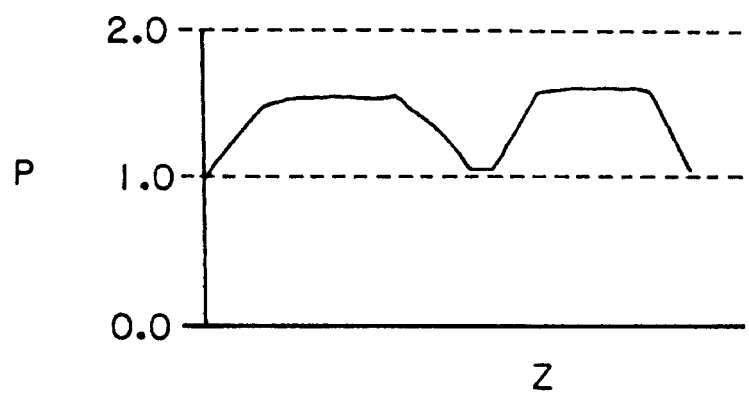
FIG. 11 illustrates a pneumatic pressure distribution chart of the prior art shaft and sleeve of FIG. 10.

FIG. 1 illustrates an embodiment of this invention. The same reference numerals shown in FIG. 8 of the prior art shall refer to like parts of this embodiment. Therefore, a detailed description of the same numerals will not be repeated.

In the embodiment, a polygon mirror 5 is adopted. However, a flat mirror or the like may also be useable instead. Circumferential air around the mirror 5 in the cavity v formed by the motor case 3 and the cover 4 is usually maintained at the same pressure as the atmosphere and is connectable to the atmosphere outside the cavity v by circulating it through the clearance between the sleeve 2 and the shaft 1, and through radial passages b and c defined in the shaft 1, which are connected to a thrust-wise central passage g defined in the center of the shaft 1. The passage g has an outlet K and a filter 23 at the lower portion thereof.

With the rotation of the mirror 5 around the shaft 1, accompanied by the hub 6 and the sleeve 2, a dynamic pneumatic pressure is created between the sleeve 2 and the shaft 1, on the periphery of which two pairs of herringbone grooves d and e are engraved, as will hereinafter be explained.

Figure 2:
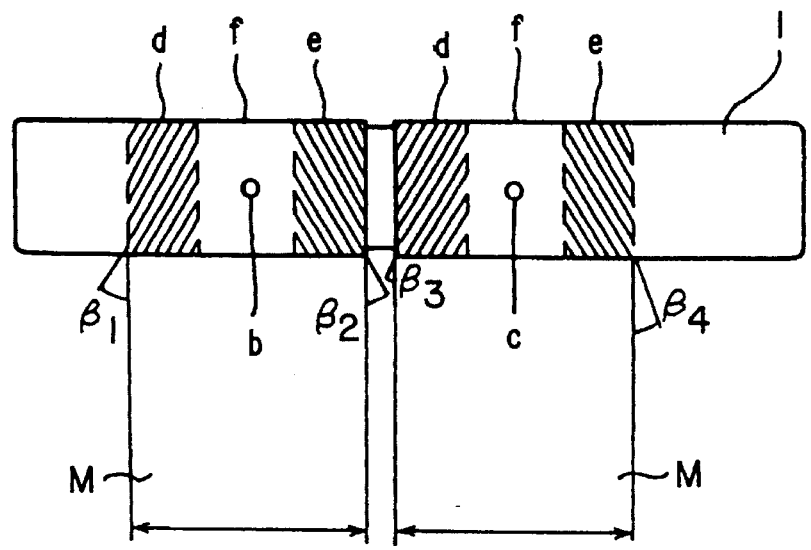
FIG. 2 indicates a flat view of a shaft of this invention.

The air pressure distribution state is now to be described, referring to FIG. 2–FIG. 7. FIG. 2 illustrates a flat view of a shaft 1 consisting of a pair of dynamic pneumatic pressure creation sections M. The pair of sections M are each provided with herringbone grooves d and e having opposite intake angles $\beta_1$, $\beta_2$, $\beta_3$ and $\beta_4$ and with non-engraved portions f left therebetween. However, another type of section M having herringbone grooves d1 and e1, shown in FIG. 4, may be adaptable. Non-engraved portions are not arranged between the herringbone grooves d1 and e1.

Figure 3:
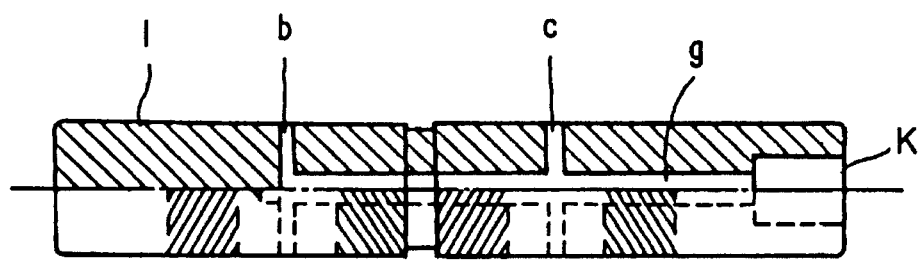
FIG. 3 is a sectional view of the upper-half of a shaft of this invention.
Figure 4:
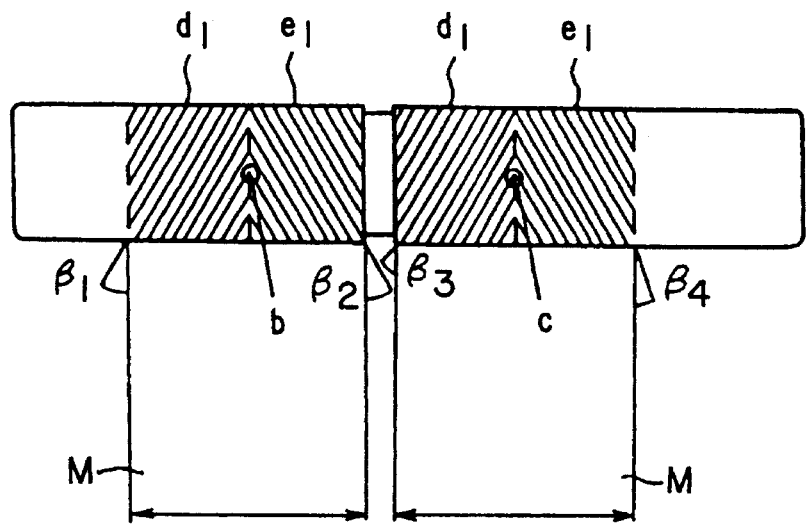
FIG. 4 is a flat view of another embodiment of a shaft of this invention.
Figure 5:
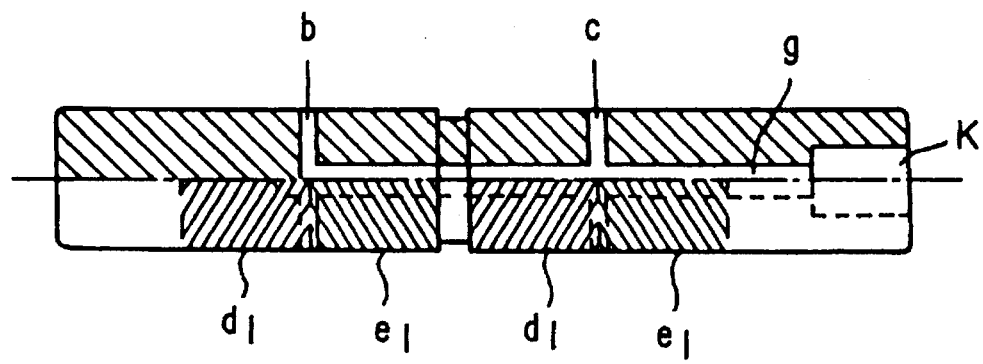
FIG. 5 illustrates a sectional view of the upper-half of FIG. 4.

In FIG. 3, the central passage g, having the outlet K exposed to the atmosphere, is defined in the center of the shaft 1. One end of each of the radial passages b and c defined in the shaft 1 are connected to the central passage g, and the other open ends are defined in the center of the non-engraved portions between the respective herringbone grooves d and e. As shown in FIG. 4, radial passages b and c are located in the center of the herringbone grooves d1 and e1, which are not provided with non-engraved portions.

Figure 6:
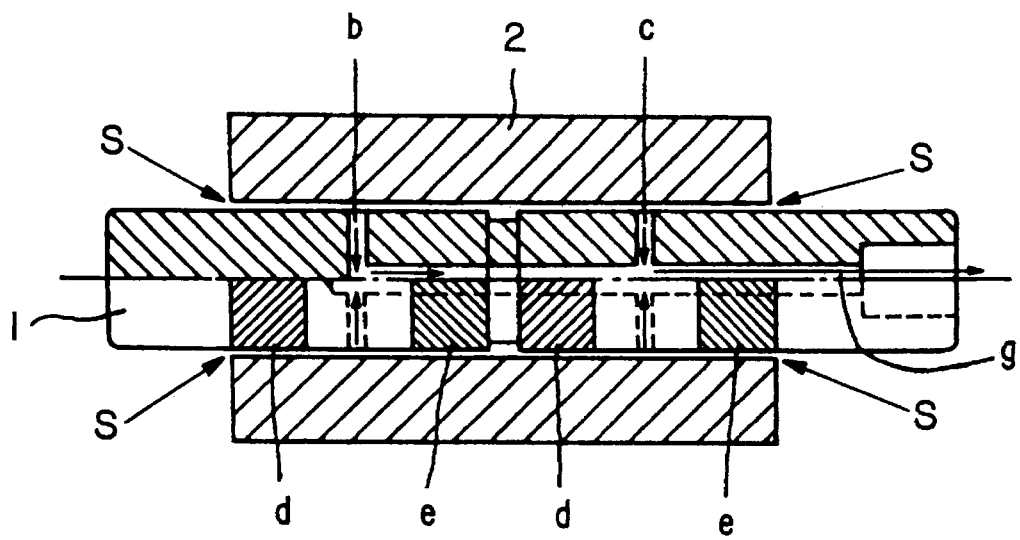
FIG. 6 is a sectional view of the sleeve and shaft of FIG. 1.

The air flow inside the optical deflector according to the present invention will now be explained with reference to FIGS. 2 and 6. The polygon mirror 5 and the sleeve 2 are attached to the hub 6 around the shaft 1 and are rotated by the motor. With this rotation, air existing in the cavity v, and existing in the clearance between the shaft 1 and the sleeve 2, is sucked from the intake S by the movement of the herringbone grooves having the suction angles $\beta_1$ and $\beta_4$, respectively, and flows into the radial passages b and c and passes through to the horizontal passage g in the direction shown by the arrows in FIG. 6. The air being sucked through the passages from the cavity v and in the clearance between the shaft 1 and the sleeve 2 is then finally released through the outlet K into the air.

Figure 7:
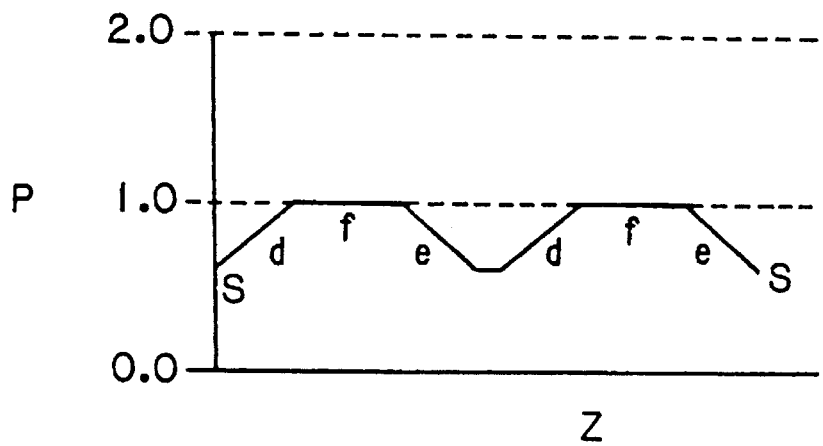
FIG. 7 illustrates a pneumatic pressure distribution chart of the embodiment shown in FIG. 6.

During the rotation of the motor, the non-engraved portions f between the herringbone grooves d and e act as a shaft support means, as will be explained hereinafter, holding the shaft to prevent swaying within the sleeve 2 during the rotation of the sleeve 2 around the shaft 1. FIG. 7 indicates a pneumatic distribution in a state of stable rotation of the rotor. The pneumatic pressure at the suction inlet s is equal to the pressure in the cavity v, while the pneumatic pressure at the non-engraved portion f of the herringbone grooves d and e is equal to atmospheric pressure. Therefore, the non-engraved portions f hold the shaft 1 to prevent swaying within the sleeve 2, whereby a smooth rotation of the sleeve 2 around the shaft may be obtained. Thus FIG. 7 shows that the pneumatic pressure inside the cavity v, which is less than the atmospheric pressure, is equal to the pneumatic pressure at the suction inlet s, while the non-engraved portion f of the herringbone grooves d and e is equal to the atmospheric pressure, whereby the non-engraved portions f are able to hold the shaft without swaying.

Therefore, the circumferential condition of the dynamic pneumatic pressure creation section M of this invention requires the pressure at each open end of the radial passages b and c to be equal to atmospheric pressure. And as shown in FIG. 6, in a state of stable rotation, the amount of radial air flow at intakes s becomes zero, and the pneumatic pressure distribution in the dynamic pneumatic pressure creation section M is as shown in FIG. 7. In FIG. 7, P represents dimensionless pressure, and when P is equal to 1, it means that the pneumatic pressure is equal to atmospheric pressure at the non-engraved portions f.

As is illustrated in FIG. 7, in the state of rotation, the pneumatic pressure at intakes s of the section M becomes smaller than atmospheric pressure and the pneumatic pressure inside the cavity may be indicated by P<1, which is smaller than an atmospheric pressure, and may be, for example, P=0.7 of atmospheric pressure. The air pressure Ps around the mirror 5 may then be indicated by Ps=0.7. The quotation of windage loss W due to the rotation of mirror is $W = Ps \times Nr^3 \times Km$. Therefore, the windage loss due to the rotation of mirror 5, in this embodiment, may be shown as:

$$W = 0.7 \times Nr^3 \times Km \text{ (watt)}.$$

The same principle of air flow is also applicable to the embodiment of FIG. 4.

In case the number of rotations Nr and the coefficient of mirror configuration Km remains the same, the windage loss of this invention may be reduced by 30%. As a result, a small energy consumption by the motor dispenses with any heat radiation device, and miniaturization and low cost production of motors may be obtained.

Another embodiment of this invention may be described hereinafter with reference to FIGS. 12, 13, 14, 15, 16, 17 and 18. Like numerals indicated in the first embodiment represent like elements adopted in this invention. Therefore, detailed description of the common elements is eliminated.

Figure 12:
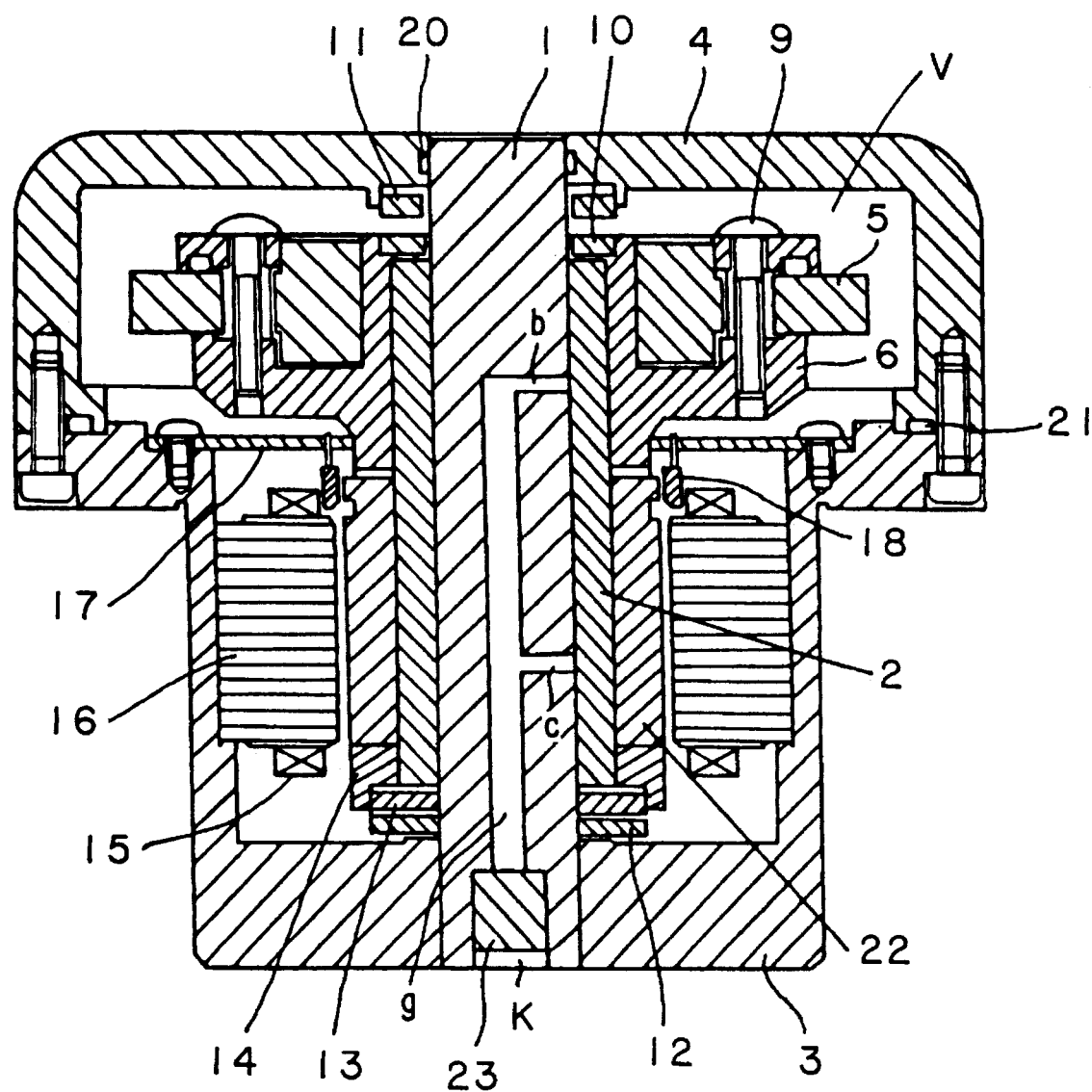
FIG. 12 illustrates a sectional front view of another embodiment of a mirror and other elements accommodated in a cavity of a motor case with a cover.

FIG. 12 corresponds to FIG. 1 of the first embodiment. Except for the herringbone groove arrangement and the distance between radial passage b and c, the structure of both embodiments is almost identical.

An air pressure distribution in the clearance between the sleeve 2 and the shaft 1 will be explained referring to FIGS. 13–18.

Figure 13:
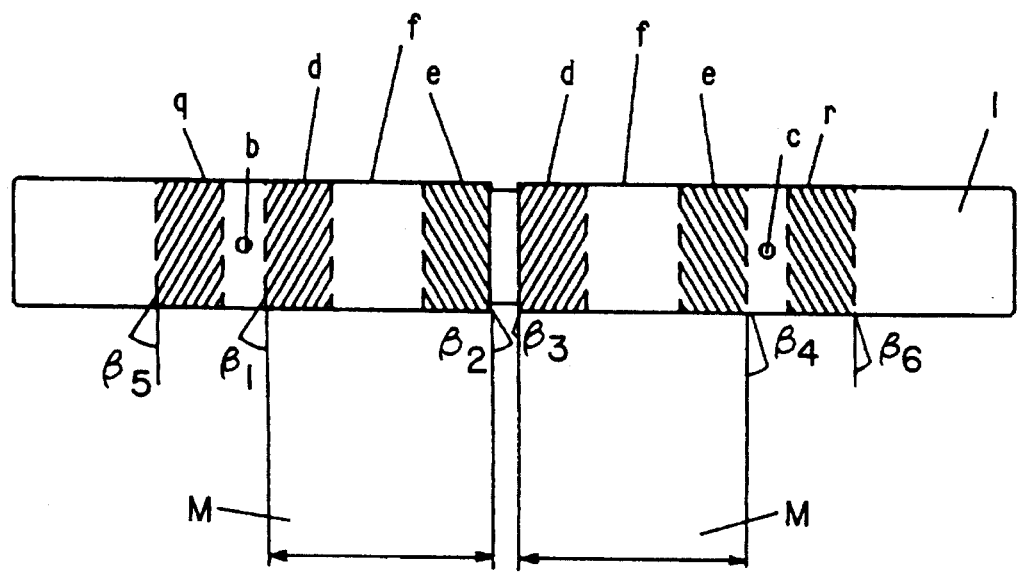
FIG. 13 is a flat view of the shaft of FIG. 12.
Figure 14:
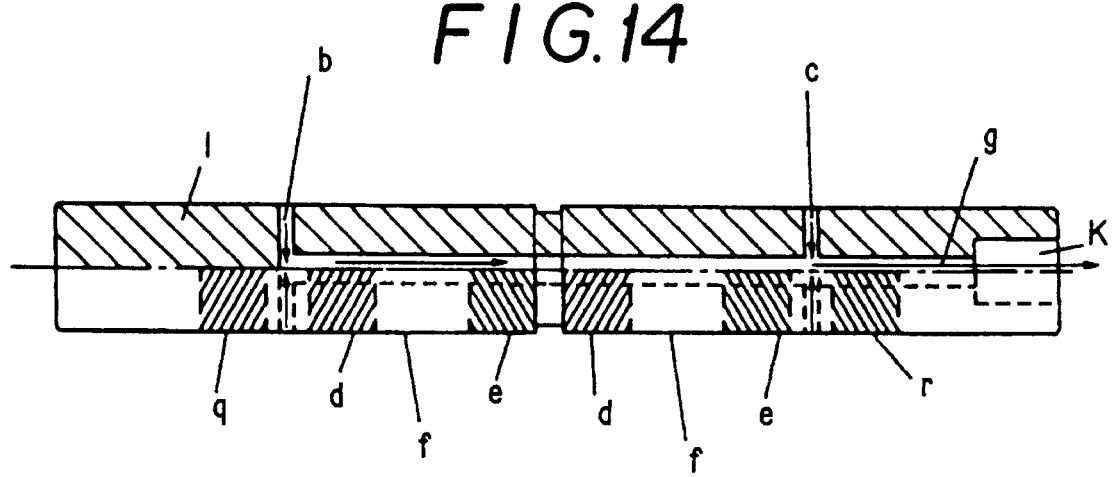
FIG. 14 is a sectional flat view of the upper-half of FIG. 13.

FIG. 13 is a plan view of the shaft 1, wherein two sets of herringbone grooves d and e, having opposite suction angles $\beta_1$ $\beta_4$, are engraved in the periphery of the shaft 1. Each set of herringbone grooves d and e composes an air pressure creation section M. Herringbone grooves q and r are also defined in the periphery of the shaft 2 in parallel with the grooves d and e, on the outer side thereof. An open end of the radial passage b is located in the center of a non-engraved portion between the herringbone grooves d and q, and another open end of the radial passage c is located in the center of a non-engraved portion between the herringbone grooves e and r.

Figure 17:
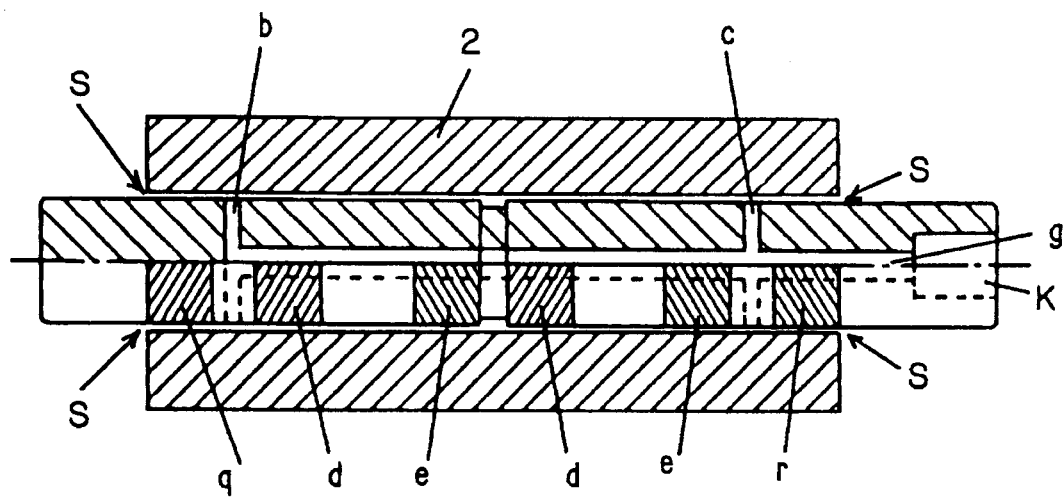
FIG. 17 is a sectional flat view of the shaft and sleeve of another embodiment of this invention.
Figure 18:
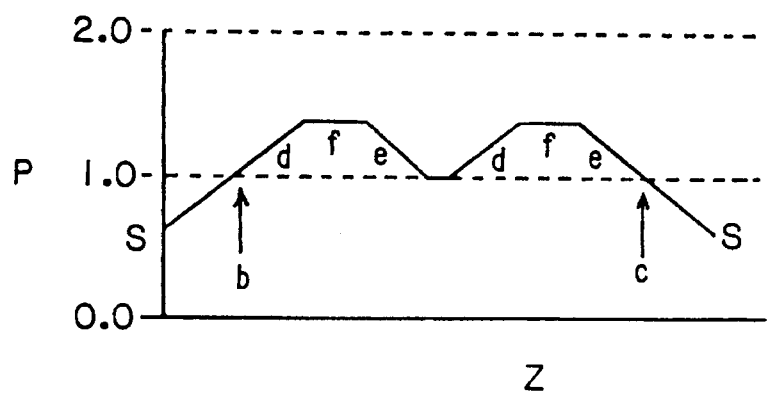
FIG. 18 illustrates a pneumatic pressure distribution chart for the embodiment of FIGS. 16 and 17.

The circumferential conditions of the pneumatic pressure creation shaft of this invention requires the pneumatic pressure at each open end of radial passage b and c be equal to the atmosphere (see FIG. 18). As shown in FIG. 17, in a state of stable rotation, the amount of air flow at intakes s becomes zero. Therefore a pneumatic pressure distribution in the dynamic pneumatic pressure creation section M is as shown in FIG. 18, wherein P, taken as the ordinate, represents dimensionless air pressure. When P is equal to numeral 1 (P=1), the pneumatic pressure is equal to the atmospheric pressure.

As is illustrated in FIG. 18, the air pressure around the intakes s becomes smaller than the atmospheric pressure, and the pneumatic pressure inside the cavity v of this invention as illustrated in FIG. 12, especially around the mirror 5, becomes smaller than the atmospheric pressure, while the maximum pneumatic pressure between the sleeve 2 and the shaft 1, which forms a dynamic pneumatic pressure creation section, is kept higher than the atmospheric pressure, especially at the non-engraved portions f, which function as a shaft support, with the result that, while reducing the windage loss, the rigidity of the shaft is maintained during the rotation of the mirror 5. It should be noted that the pneumatic pressure at the passage b and c is equal to the atmospheric pressure.

Figure 15:
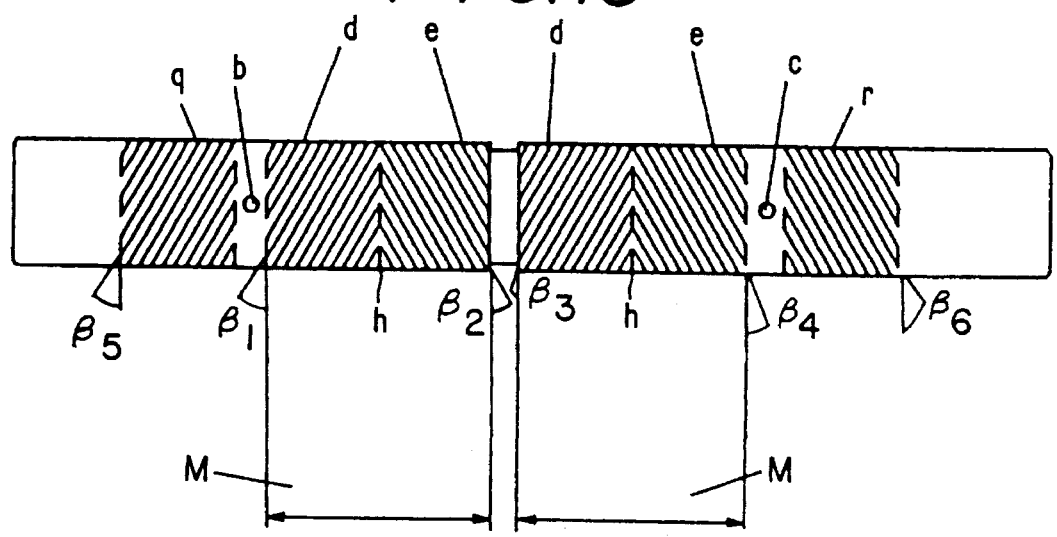
FIG. 15 is a flat view of another shaft.
Figure 16:
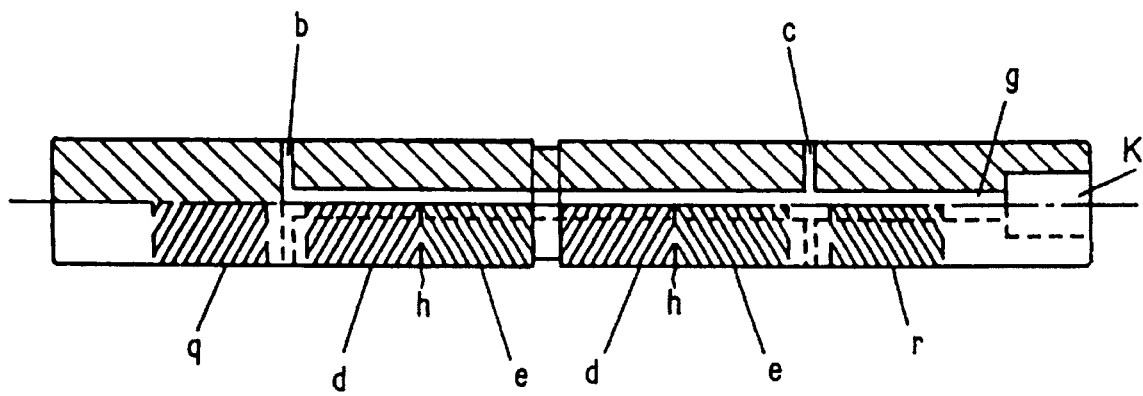
FIG. 16 is a sectional view of the upper-half of the shaft shown in FIG. 15.

FIG. 15 illustrates a further embodiment wherein non-engraved portions do not exist between the herringbone grooves d and e. The same principle of air flow as explained above with reference to FIG. 17 may be applicable. However, in this case a middle portion h where herringbone grooves d and e meet acts as a shaft support, having a pneumatic pressure that is higher than that of the non-engraved portions shown in FIG. 18. The pneumatic pressure at the middle portions h of FIG. 15 is illustrated by the dotted lines shown in FIG. 18.

Thus the present invention reduces the pneumatic pressure inside the cavity with a resultant reduction of windage loss, and simultaneously maintains the maximum pneumatic pressure in the clearance between the sleeve and the shaft, especially at the non-engraved portions between the herringbone grooves, higher than atmospheric pressure. Thus the rigidity of the rotating shaft may be maintained.

We claim:

1. An optical deflector, comprising:

a motor case having a cavity, an inside wall and a cover, and said motor case having a shaft therein;

a hub in said motor case, said hub having a scanning mirror thereon;

a cylindrical sleeve disposed so as to be rotatable around said shaft with a clearance between said shaft and said sleeve, said hub being fixed to said cylindrical sleeve, and said cylindrical sleeve having a magnet supporting arrangement supporting said cylindrical sleeve in said motor case; and a motor in said motor case, said motor comprising a ring magnet fitted around said cylindrical sleeve and a yoke having a coil wound therearound fixed to said inside wall of said motor case;

wherein said shaft has a periphery provided with a plurality of pairs of herringbone grooves engraved therein and provided with non-engraved portions between at least some of said pairs of herringbone grooves, a central passage extending through the center of said shaft, said central passage having an outlet at one end thereof communicating with the exterior of said motor case, and radial passages in said shaft having two opposite ends including first ends thereof connected with said central passage and second ends thereof opening on said periphery of said shaft at central locations in respective said non-engraved portions; and wherein suction intakes to said plurality of pairs of herringbone grooves are defined between said shaft and said sleeve at outer edges of outer ones of said herringbone grooves;

whereby said sleeve, together with said hub and said scanning mirror, can be rotated by said motor, and thereby air in said cavity of said motor case and in said clearance between said shaft and said sleeve is suctioned from said suction intakes and flows into said radial passages in said shaft to said central passage and is vented to the atmosphere through said outlet, and the pneumatic pressure inside said motor case is reduced by the venting of the air to the atmosphere.

2. The optical deflector of claim 1, wherein there are three pairs of said herringbone grooves, said outer ones of said herringbone grooves comprising one of said three pairs of herringbone grooves, said outer ones of said herringbone grooves having the other two of said three pairs of herringbone grooves therebetween on said periphery of said shaft and having respective ones of said non-engraved portions having said radial passages opening at central locations thereon separating said outer ones of said herringbone grooves from the other two of said three pairs of herringbone grooves, whereby the air in said cavity being suctioned upon rotation of said sleeve on said shaft and flowing into said radial passages, to said central passage and vented via said outlet causes the dynamic pneumatic pressure in said clearance between said shaft and said sleeve at the other two pairs of herringbone grooves to be maintained higher than atmospheric pressure, thereby maintaining an effective rigidity of said shaft during rotation of said sleeve.

3. The optical deflector of claim 2, wherein the other two of said three pairs of said herringbone grooves have no said non-engraved portions therebetween.

4. The optical deflector of claim 1, wherein two of said pairs of said herringbone grooves have no said non-engraved portions therebetween.

5. The optical deflector of claim 1, wherein said magnet supporting arrangement comprises magnets fixed to opposite ends of said sleeve and corresponding magnets fixed to said motor case, said sleeve further having a spacer at one end thereof.

6. An optical deflector, comprising:

a motor case having an inside wall and a cover, and said motor case further having a shaft mounted therein;

a hub in said motor case, said hub having a scanning mirror thereon;

a cylindrical sleeve disposed so as to be rotatable around said shaft with a clearance between said shaft and said sleeve, said hub being fixed to said cylindrical sleeve, and said cylindrical sleeve having a lower portion with a spacer and magnetic supporting arrangement supporting said cylindrical sleeve in said motor case; and a motor in said motor case, said motor comprising a ring magnet fitted around said cylindrical sleeve and a yoke having a coil wound therearound fixed to said inside wall of said motor case;

wherein said shaft has a periphery provided with a plurality of pairs of herringbone grooves engraved therein and provided with non-engraved portions between at least some of said pairs of herringbone grooves, a central passage extending through the center of said shaft, said central passage having an outlet at one end thereof communicating with the exterior of said motor case, and radial passages in said shaft each having two opposite ends including a first end thereof connected with said central passage and a second end thereof opening on said periphery of said shaft at central locations in respective said non-engraved portions; and wherein suction intakes to said plurality of pairs of herringbone grooves are defined between said shaft and said sleeve at outer edges of outer ones of said herringbone grooves.

7. The optical deflector of claim 6, wherein there are three pairs of said herringbone grooves, said outer ones of said herringbone grooves comprising one of said three pairs of herringbone grooves, said outer ones of said herringbone grooves having the other two of said three pairs of herringbone grooves therebetween on said periphery of said shaft and having respective ones of said non-engraved portions having said radial passages opening at central locations thereon separating said outer ones of said herringbone grooves from the other two of said three pairs of herringbone grooves.

8. The optical deflector of claim 7, wherein the other two of said three pairs of said herringbone grooves have no said non-engraved portions therebetween.

9. The optical deflector of claim 6, wherein two of said pairs of said herringbone grooves have no said non-engraved portions therebetween.

10. An optical deflector, comprising:

a motor case having a cavity, an inside wall and a cover, and said motor case further having a shaft mounted therein;

a hub in said motor case, said hub having a scanning mirror thereon;

a cylindrical sleeve disposed so as to be rotatable around said shaft with a clearance between said shaft and said sleeve, said hub being fixed to said cylindrical sleeve, and said cylindrical sleeve having a lower portion with a spacer and magnetic supporting arrangement supporting said cylindrical sleeve in said motor case;

a motor in said motor case, said motor comprising a ring magnet fitted around said cylindrical sleeve and a yoke having a coil wound therearound fixed to said inside wall of said motor case; and means for suctioning air from said cavity of said motor case and from said clearance between said shaft and said sleeve and causing the air to flow to the exterior of said motor case such that the pneumatic pressure inside said motor case is reduced to a pressure below the air pressure outside of said motor case during rotation of said sleeve with said hub and said polygonal mirror by said motor.

11. The optical deflector of claim 10, wherein said means further causes a dynamic pneumatic pressure to be created during rotation of said sleeve about said shaft between said shaft and said sleeve that is higher than the pneumatic pressure inside said cavity during rotation.

12. The optical deflector of claim 11, wherein the dynamic pneumatic pressure created during rotation between said sleeve and said shaft is equal to atmospheric pressure.

13. The optical deflector of claim 11, wherein the dynamic pneumatic pressure created during rotation between said sleeve and said shaft is greater than atmospheric pressure.

14. The optical deflector of claim 11 wherein the dynamic pneumatic pressure created during rotation between said sleeve and said shaft that is higher than the air pressure inside said cavity is created at separate points spaced along said shaft.

* * * * *